United States Patent

Koechler

[11] Patent Number: 5,598,148
[45] Date of Patent: Jan. 28, 1997

[54] METHOD AND A NETWORK FOR TRANSMITTING LOCAL AND GLOBAL RADIO CALLS

[75] Inventor: Helmut Koechler, Samstagern, Switzerland

[73] Assignee: Erika Koechler, Samstagern, Switzerland

[21] Appl. No.: 323,550

[22] Filed: Oct. 17, 1994

[30] Foreign Application Priority Data

Dec. 3, 1993 [EP] European Pat. Off. ............. 93119476

[51] Int. Cl.$^6$ ............................................. H04Q 1/00
[52] U.S. Cl. ........................... 340/825.21; 340/825.44; 370/528; 455/38.1
[58] Field of Search ..................... 340/825.44, 825.5, 340/825.51, 825.21; 370/111, 112; 455/38.1

[56] References Cited

U.S. PATENT DOCUMENTS

| | | | |
|---|---|---|---|
| 3,995,120 | 11/1976 | Pachynski | 370/111 |
| 4,937,820 | 6/1990 | Kawula | 370/111 |
| 5,168,271 | 12/1992 | Hoff | 340/825.44 |
| 5,265,033 | 11/1993 | Vajk | 340/825.44 |
| 5,285,199 | 2/1994 | Pocek | 370/111 |

FOREIGN PATENT DOCUMENTS

| | | |
|---|---|---|
| 0536539 | 4/1993 | European Pat. Off. |
| 2173674 | 10/1986 | United Kingdom . |
| 9211707 | 7/1992 | WIPO . |

Primary Examiner—Brian Zimmerman
Attorney, Agent, or Firm—Ladas & Parry

[57] ABSTRACT

A paging network having a master transmitter and several local radio transmitters is disclosed. The network is designed to allow the transmission of local and global messages. Global messages must be sent by all radio transmitters synchronously. Local messages are only sent by a single radio transmitter. The master transmitter generates a signal that contains the global messages and sends it to the radio transmitters. If a radio transmitter has no local messages to be sent, it emits the unchanged signal received from the master transmitter. If a radio transmitter has one or more local messages to be added to the signal, it will determine if there are suitable gaps in the signal received from the master transmitter where the local messages can be included. If such gaps are found, the local messages are added to the signal to generate a modified signal which is then emitted by the radio transmitter. In order to allow a forward recognition of gaps in the signal sent by the master transmitter, special gap markers or allocation messages can be added. The proposed method makes it easy to exploit the capacity of the available radio channel.

5 Claims, 5 Drawing Sheets

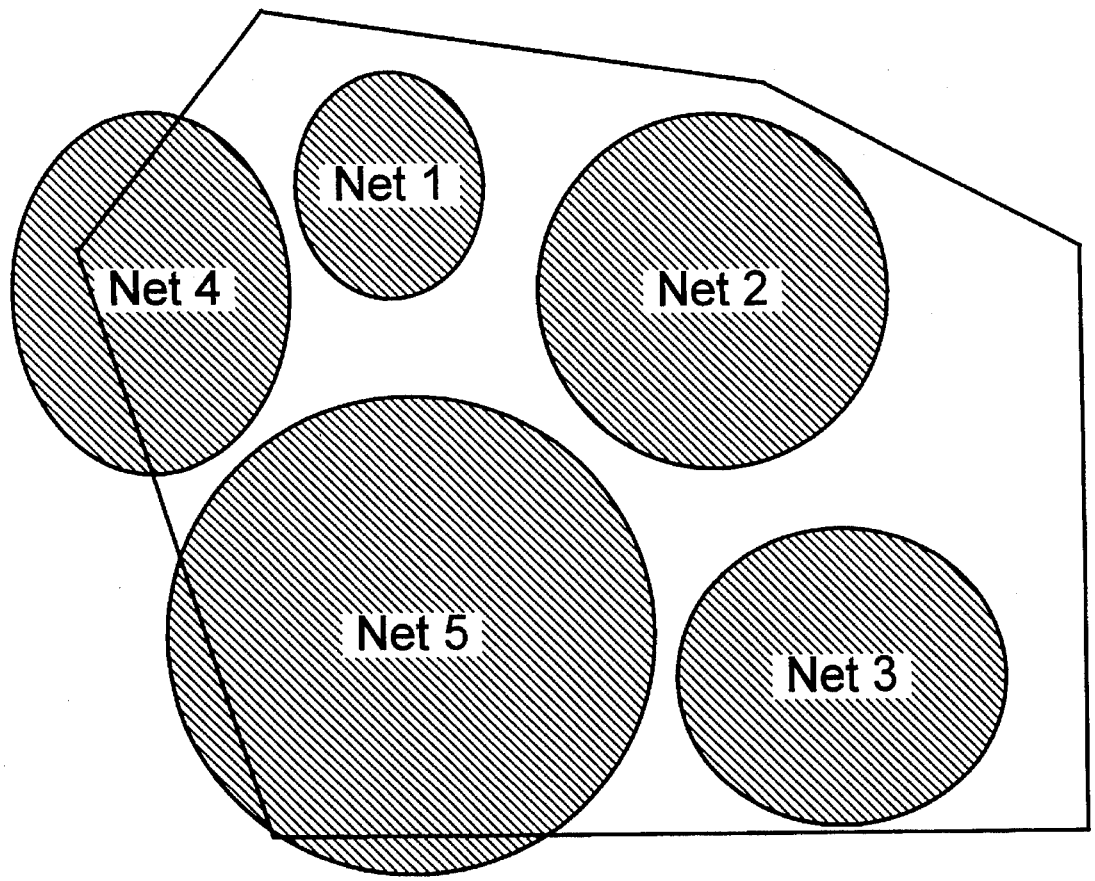
F I G. 12

METHOD AND A NETWORK FOR TRANSMITTING LOCAL AND GLOBAL RADIO CALLS

BACKGROUND OF THE INVENTION

1. Field of the Invention

The invention relates to a method for operating a radio transmitter sending digital messages, which radio transmitter receives high priority messages from a first source and low priority messages from a second source, wherein each high priority message is to be sent at a predefined time.

In a radio paging network with such transmitters, the global paging calls (which have highest priority) must be sent by all transmitters simultaneously to avoid interference problems between neighboring radio transmitters. Local paging calls are usually restricted to the range of only one (or a few) radio transmitter. Therefore, a radio transmitter sending a local paging call is not required to be synchronized with the other radio transmitters.

2. Description of the Prior Art

EP-A 0 536 539 describes a network where the radio transmitters are regularly switched between a local and a global transmission mode. In the global transmission mode, all transmitters are synchronized and send out the global paging calls. In the local transmission mode, each transmitter individually sends its local paging calls and is not synchronized with the other transmitters. The transmission of the global calls ends before the transmission of the local calls starts. Each transmission requires a completely new transmission sequence, independent of the previous transmissions. Furthermore, it is found that in this system there are unused gaps in the transmissions. These gaps occur because in existing standard paging codes such as POCSAG and ERMES, messages can only start at certain times, which are defined by the receiver's address. In a very large system with a variety of lengths of messages, these spaces are unusual. In small systems, however, which have only a few addresses, it is more likely that gaps occur. In systems where a few addresses are often used this problem may become severe, resulting in an inefficient use of the radio channel.

SUMMARY OF THE INVENTION

Hence, it is a general object of the invention to provide a method of the kind mentioned above that is easy to implement and does not show these disadvantages and allows an efficient use of the radio channel.

Now, in order to implement these and still further objects of the invention, which will become more readily apparent as the description proceeds, one aspect of the method for operating a radio transmitter sending digital messages is manifested by the features that said radio transmitter is receiving high priority messages from a first source and low priority messages from a second source, wherein each of said high priority messages is to be send at a predefined time, wherein said high priority messages are fed to the radio transmitter in a global signal substantially corresponding to the signal to be emitted by the radio transmitter in the absence of low priority messages, and wherein gaps between said high priority messages in said global signal are determined in said radio transmitter and each low priority message is inserted into said global signal by replacing at least part of one of said gaps by said low priority message.

In accordance to a further aspect of the present invention, the method for operating a radio transmitter sending digital messages is manifested by the features that said radio transmitter is receiving high priority messages from a first source and low priority messages from a second source, wherein said high priority messages are fed to said radio transmitter grouped in sequences, each sequence comprising a plurality of high priority messages and a list of addresses designating receivers for said high priority messages, wherein said list of addresses comprises at least one dummy address, and wherein at least one of said low priority messages is placed in a gap between said high priority messages and wherein said at least one dummy address is replaced by a destination address of said at least one low priority message placed into said gap.

In accordance to a still further aspect of the present invention, the method for operating a radio transmitter sending digital messages is manifested by the features that said radio transmitter is receiving high priority messages and low priority messages, wherein each high priority message is to be sent at a predefined time, wherein said high priority messages are fed to the radio transmitter in a global signal consisting of a stream of code words, said stream of code words comprising marked, unused code words, wherein at least a part of said unused code words is replaced by at least one of said low priority messages.

By placing the local, low priority calls in the gaps between the global, high priority calls, i.e. by using unused code words of the global signal for low priority calls, the radio channel is used optimally. Each transmission sequence can contain global as well as local calls, all calls sharing a common preamble. Gaps in the sequence can be filled by local paging calls.

Preferably, a master transmitter is provided for sending the global signal to the radio transmitters. This global signal substantially corresponds to the signal to be emitted by the local transmitter in the absence of local paging calls. It can be fully formatted and ready to be broadcast. The radio transmitters then analyze each received global signal for gaps to place the local, low priority messages in. For this purpose, the gaps in the global signal can be marked, e.g. by conventional idle words or by additional data.

In one embodiment, the global signal is buffered in the local radio transmitters. The buffered part of the signal is searched for unused gaps that can be replaced by local messages. This is a very simple method that is fully transparent for the master transmitter.

Buffering a long sequence is often impossible because the received global signal should be retransmitted with only minor delay. In this case, the master transmitter can add code words or messages allowing the local radio transmitter to predict the length and position of gaps in advance. This can be achieved by for example using different kind of idle words, wherein each idle word indicates the length of the gap following it. Alternatively or additionally, allocation information can be added to the global signal sent by the master transmitter. This allocation information describes the position and length of gaps in the following signal.

When using the ERMES paging code or a similar coding scheme, the master transmitter may add dummy addresses to the address list of a transmission sequence that can be replaced in the radio transmitters by the addresses of local paging calls.

The method can be implemented in a network for sending paging calls, preferably by providing a master transmitter for feeding the radio transmitters with the global signal containing the global, high priority calls. Each radio transmitter can be provided with an input for local, low priority calls, a buffer to store the local calls, and a control unit to insert the local paging calls into the signal.

BRIEF DESCRIPTION OF THE DRAWING

The invention will be better understood and objects other than those set forth above will become apparent when consideration is given to the following detailed description thereof. Such description makes reference to the annexed drawings, wherein:

FIG. 12 is a possible coverage of a country by several networks.

DESCRIPTION OF THE PREFERRED EMBODIMENTS

Figure 2:
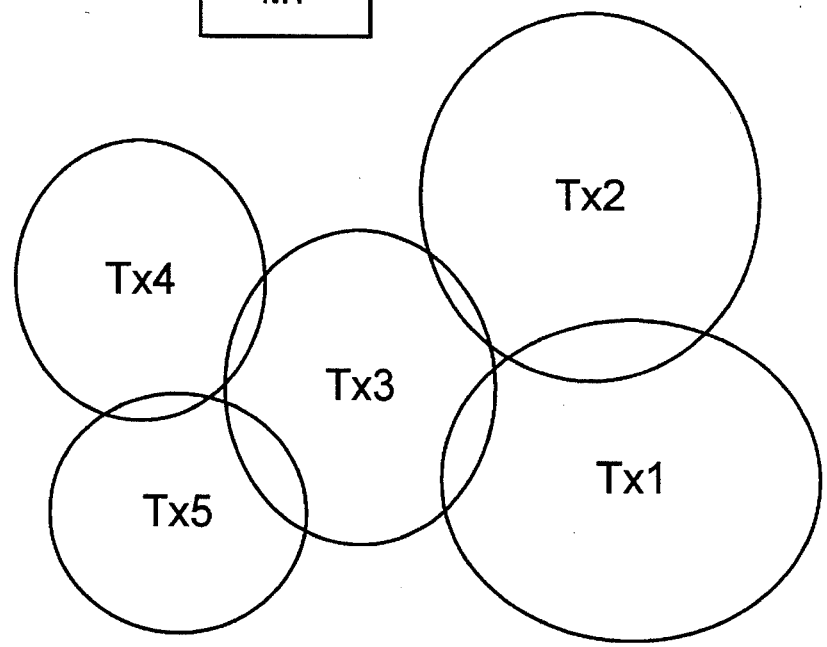
FIG. 2 is a simplified map of the ranges of individual radio transmitters.

In a national or international paging system there may be a single or a plurality of groups of transmitters, each group of transmitters may be configured in a way shown in FIG. 2 in which there is some coverage overlap between different transmitters. If each group of transmitters is considered as a network then in one country (Country A) there may be several such networks (see FIG. 12). (FIG. 12 is only to be a considered as adding clarification to the text. It is only an example of the various possible situations that may arise.)

In general there will be transmitters that produce a coverage area which will either overlap the coverage area of one or more other transmitters, or will not overlap the coverage area of any transmitter.

Each transmitter receives data from a source or sources which will be required to be transmitted. The link between the possible sources and the transmitter may be via radio or landline or any other suitable medium.

In this description, the data to be transmitted is of two different types, global and local. The global data is, in general, common to all transmitters that have overlapping coverage areas. Each network as shown in FIG. 2 would usually have the same global data. Other networks as shown in FIG. 12 may also share common global data. It is possible that all the networks would transmit the same global data. On the other hand local data is more closely associated with a particular transmitter and therefore it is possible that each transmitter in a network as shown in FIG. 2 may transmit different local data. It is also possible that several transmitters in a group could transmit the same local data.

Figure 1:
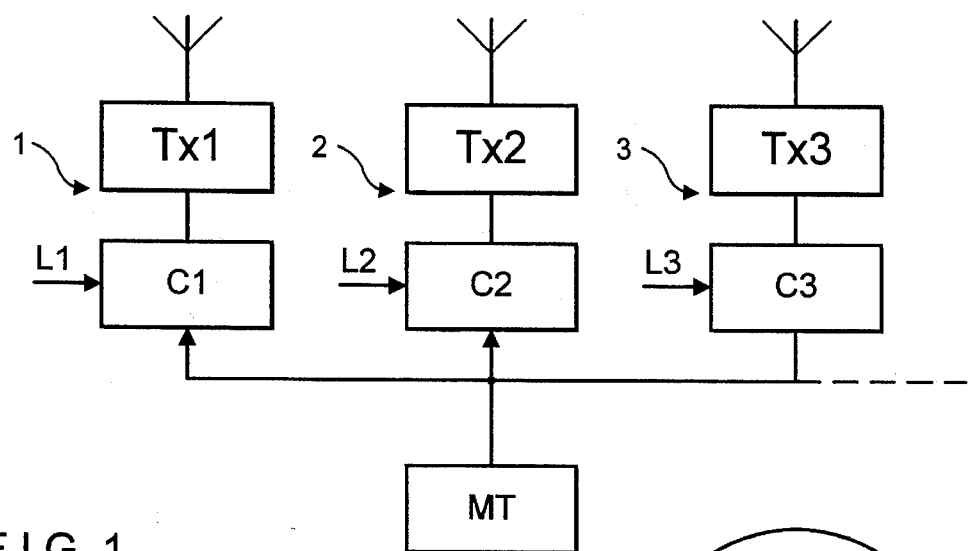
FIG. 1 shows a simplified block diagram of an embodiment of the invention.

A simplified block diagram of an embodiment of the invention is shown in FIG. 1. This figure shows a network for sending paging calls. It must be clearly understood, however, that the invention is not restricted to networks for sending paging calls but can be used in other, similar systems where local radio transmitters must combine high priority and low priority data and where the time to send the high priority data is fixed.

The network comprises a master transmitter MT sending a global signal containing the global calls to a plurality of local radio transmitters 1, 2, 3. Each local radio transmitter has a combiner C1, C2, C3 and a radio station Tx1, Tx2, Tx3 for sending the radio signals. The combiner is designed to combine the global signal with local paging calls provided at the inputs L1, L2, L3. The method of operation of the combiner will be described below.

Each radio transmitter is responsible for broadcasting the calls in a given geographical area. A simplified map of this situation is shown in FIG. 2, where five transmitters Tx1–Tx5 are covering their respective areas.

Before discussing the operation of the inventive network, we will first briefly discuss the operation of a conventional network as described in EP-A 0 536 539.

Figure 3:
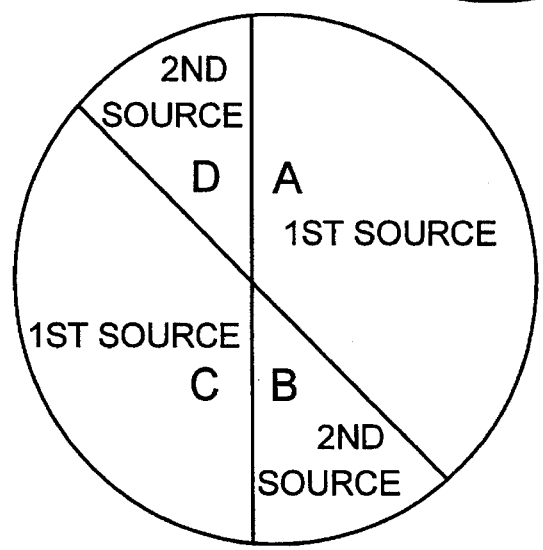
FIG. 3 shows the operation cycle of a conventional pager network.

A transmitter of the conventional network is operated in a cycle as shown in FIG. 3. It first transmits global calls from the master transmitter (1st source) in a phase A. Then it transmits local calls from a second source in phase B. Then it again transmits global calls (phase C), then again local calls (phase D), etc. In phases A and C, all transmitters send the same signal simultaneously. In phases B and D, each transmitter sends its own, local calls.

Figure 4:
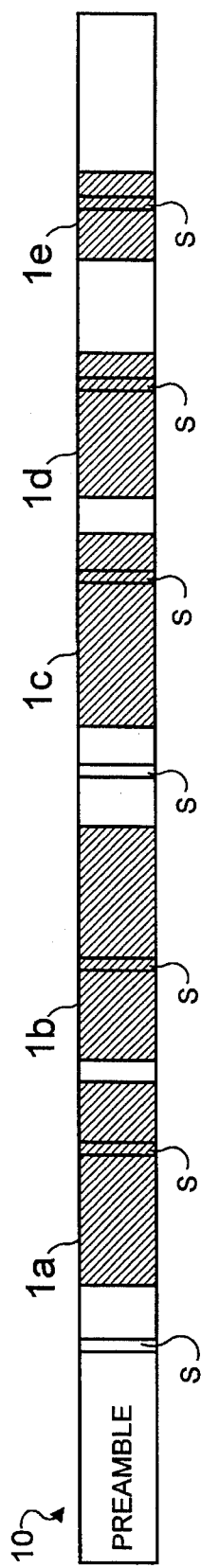
FIG. 4 is a transmission sequence containing global calls only.
Figure 5:
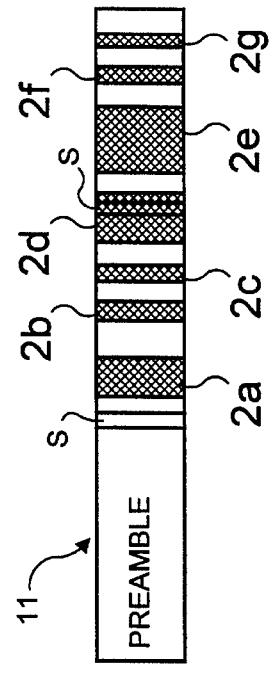
FIG. 5 is a transmission sequence containing local calls only.

A possible global transmission sequence 10 sent during phase A or C is shown in FIG. 4, a local transmission sequence 11 sent during phase B or D in FIG. 5. In the present example, the transmissions are coded in the POCSAG format or a similar coding scheme. It must be pointed out, however, that the invention is also applicable to other coding schemes.

The transmission sequences shown in FIGS. 4 and 5 each consist of a stream of code words. They have a header (preamble) followed by the individual paging calls (gray areas 1a–1e and 2a–2g). Furthermore, synchronization words "s" are located in the sequence at regular intervals as required by the POCSAG standard.

In the inventive system, the sequence 10 containing the global messages 1a–1e as shown in FIG. 4 is transmitted as a global signal from the master transmitter MT to the all local radio transmitters 1–3. The local calls 2a–2g (which are not necessarily coded in a sequence 11 as shown in FIG. 5 but may be delivered in any suitable form) are fed to the combiner C1, C2 or C3 of the desired radio transmitter via input L1, L2 or L3. They are stored in a buffer of the transmitter.

The combiner determines the gaps in the global signal (shown as white areas in FIG. 4). It then fills these gaps with the local messages 2a–2g. When placing a local message into a gap, the gap must be sufficiently large to contain the whole local message. Also, in the POCSAG coding scheme, the position of the start of the of a local message in respect to the preceding synchronization word "s" cannot be chosen arbitrarily but is a function of the address of the recipient.

The POCSAG code demands that between any two messages there must be at least two address type codewords. When only messages are being sent from the first source, i.e. from the master transmitter, this requirement ensures that an idle word is inserted in between two messages. If a tone only call is waiting from the second source (L1–L3), these tone-only addresses may be used instead of the idle word. If there is a gap between the transmission of two messages and a local, suitable length message can be inserted into this gap, then again the number of idle words in the message can be reduced. Using these two simple algorithms, the amount of idle words emitted by the radio transmitters can be reduced, thereby increasing the information transmitted.

Figure 6:
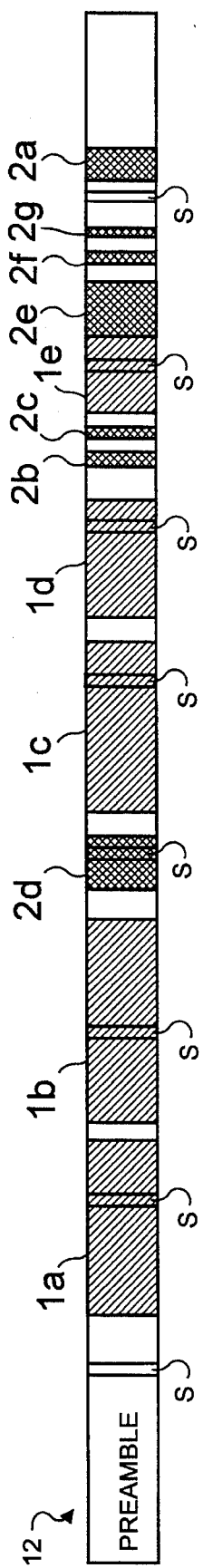
FIG. 6 is a transmission sequence containing global and local calls as sent by an inventive radio transmitter.

The resulting message 12 that is sent by the local transmitter is shown in FIG. 6. It can be seen that the position of the global messages 1a–1e in the sequence have not been changed thereby assuring synchronization of the global messages sent by the individual radio transmitters 1–3. The local messages 2a–2g were inserted at suitable positions in the gaps of the original global message sequence. The sequences emitted by the individual radio transmitters are therefore identical during the transmission of the global calls but may differ in the gaps between the global calls.

The details of the implementation of the invention depend on the fact if the incoming global data signal can be buffered in the radio transmitters or not. In the following three techniques are described that can be used alone or in combination.

TECHNIQUE 1

The simplest implementation of the inventive scheme is to use a store and forward procedure, where the incoming global signal is collected and buffered in the transmitters and then sent out at a correct time. In this case the whole (or at least a substantial part of the) global signal as shown in FIG. 4 is available to the transmitter before it must be sent. Therefore, it can be analyzed for gaps by the combiner. If possible, the gaps are then replaced by suitable local messages as described above and the modified sequence is sent at the correct time.

TECHNIQUE 2

Certain efficiencies can be achieved if the data is transmitted transparently through the local transmitters 1–3, so that there is only a minimum time difference between signals received by the local transmitter and being re-transmitted. In order to place the local calls, it is necessary for the local transmitters to have an a priori knowledge when a certain number of idle words are about to be transmitted.

In this case it is therefore proposed that one special address is attributed to the system and is not used for a normal paging receiver. The message accompanying this address (called allocation message) consists of bits, each of which representing one of the following codewords. If a bit in the message is "1", then the corresponding code word is an address or message (i.e. the code word is used). If a bit is "0", its corresponding code word is an idle word (i.e. it is not used) and can be replaced by a suitable address or message code word at the local transmitter.

The allocation message is sent under its predefined address at a suitable time by the master transmitter MT, so that the information contained therein can be received and used by the local radio transmitters 1–3. The length of the allocation message is not fixed but chosen by the master transmitter, e.g. to contain all idle words to the end of the current sequence. The allocation message is only sent when there are some idle words to be transmitted. A further special address may be used to indicate the point when the global signal 10 contains no further data.

By using the information in the allocation message, each local transmitter can then add any suitable local messages without modifying the global messages.

Figure 7:
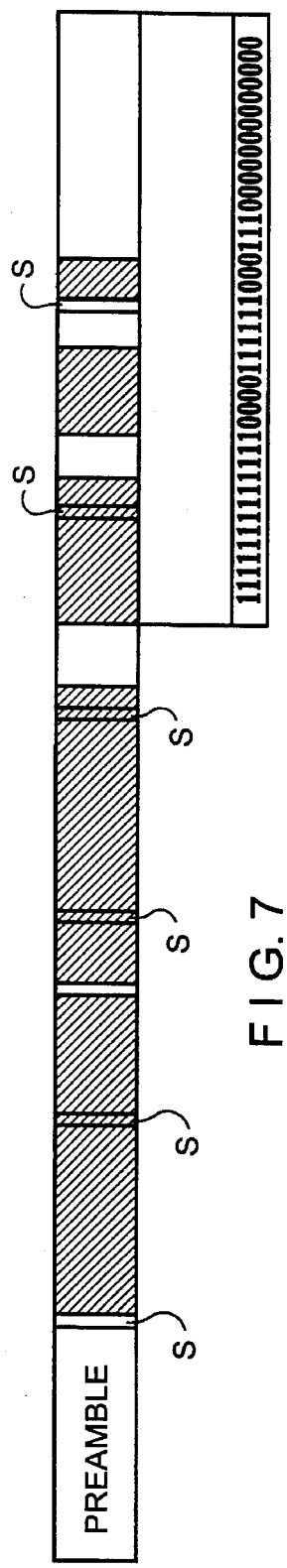
FIG. 7 is a transmission sequence and a allocation message describing the idle words in its last part.
Figure 8:
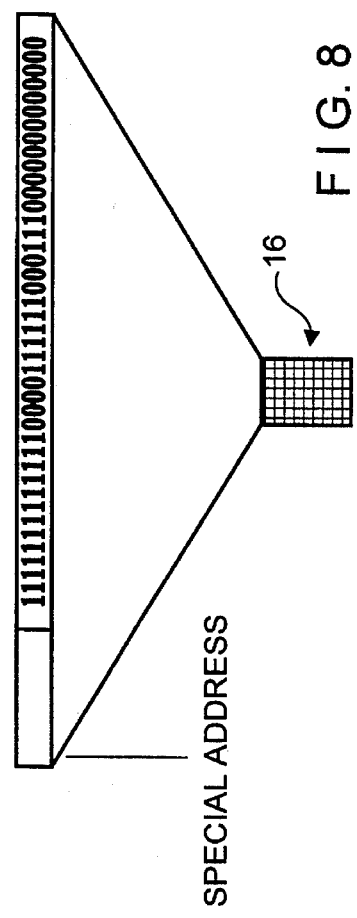
FIG. 8 shows the allocation message of FIG. 7 together with its address.
Figure 9:
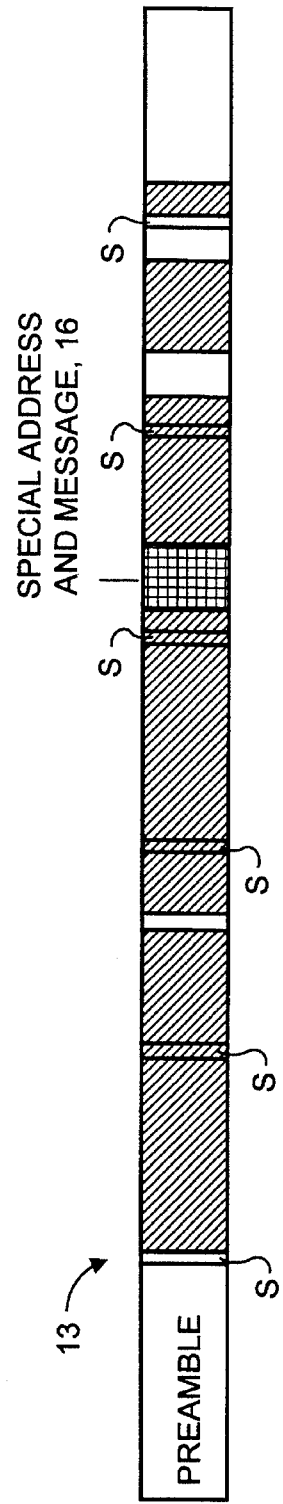
FIG. 9 shows the transmission sequence of FIG. 7 together with the allocation message of FIG. 8.
Figure 10:
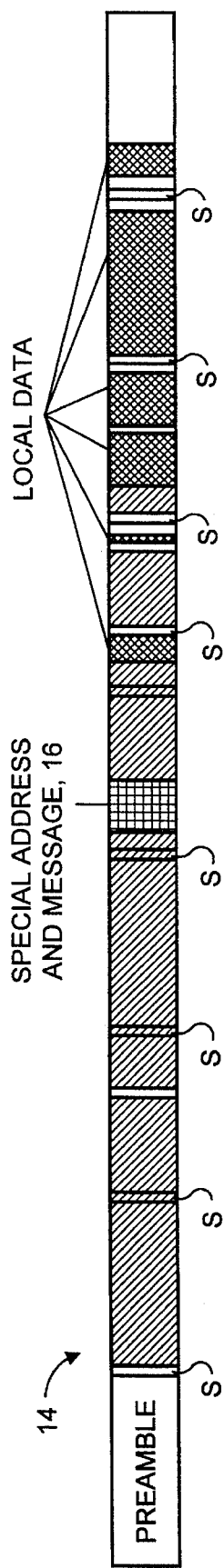
FIG. 10 shows the sequence of FIG. 9 containing local messages as it is emitted by the radio transmitters.

FIG. 7 shows a transmission sequence in the POCSAG code format. It contains the global calls. It can be seen that after the 4th synchronization word "s" there is a significant gap in the transmission. The master transmitter places the allocation message in this gap. The binary data in the message is calculated as shown in FIG. 7 as a sequence of 1 and 0 representing the content of the following batches up to the end of the transmission sequence. The predefined special address of the allocation message is then added to this binary data as shown in FIG. 8 and the message is inserted into the gap as shown in FIG. 9. The message 13 of FIG. 9 is sent as a global signal to the radio transmitters, where the allocation message is decoded and local data is inserted in the gaps as shown in the sequence 14 of FIG. 10.

TECHNIQUE 3

Where it is possible to delay the transmission of the data by at least one code word, another technique can be used because each code word can be checked before it is sent. Using this possibility, a set of predetermined code words can be defined to be used as follows:

Consider a set of predetermined address type code words, each one of which defines the number of consecutive following idle words before the next message starts. These predefined code words are reserved for the network and must not be used as receiver addresses. The following is a table with a list of four such codewords:

| Code Word: | No. of words before next message: |
|---|---|
| 2007672 | 1 |
| 2007680 | 2 |
| 2007688 | 3 |
| 2007696 | 4 |
| . | . |
| . | . |
| . | . |

Figure 11:
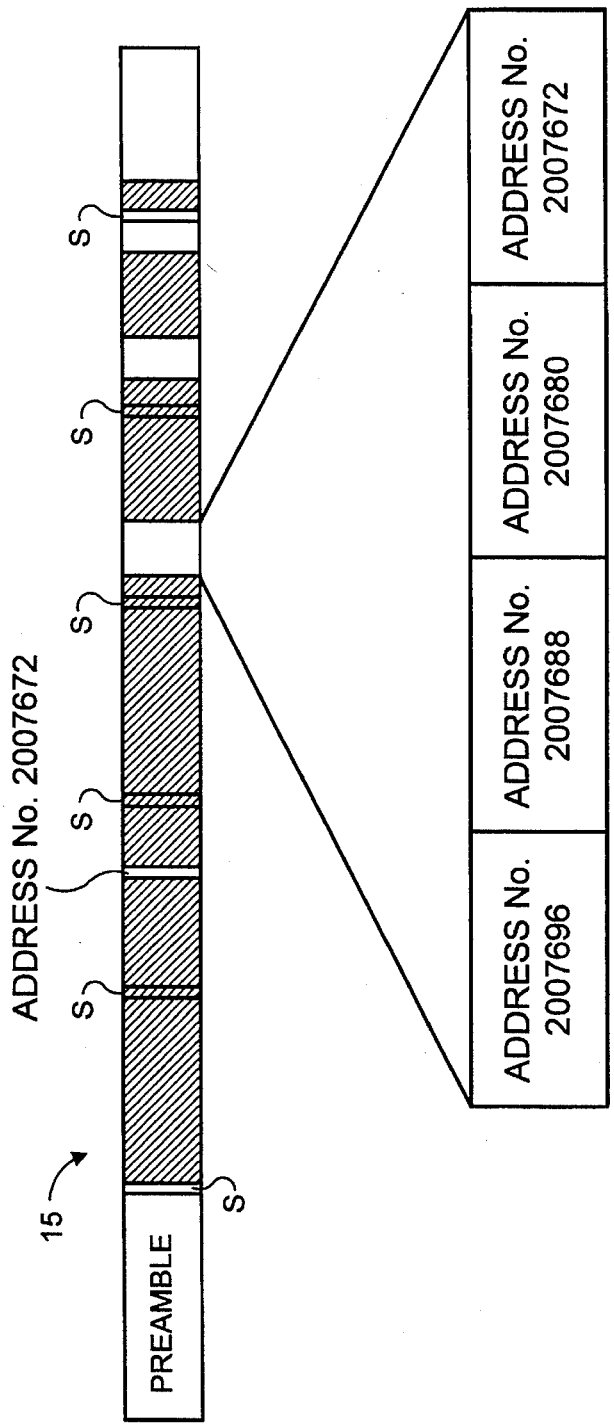
FIG. 11 is a transmission sequence using special gap markers.

When one idle word is used between messages, instead of sending the normal POCSAG idle word, the master transmitter sends the address 2007672 (see sequence 15 of FIG. 11). This will then be decoded by the local transmitter as indicating that one idle word is available for replacement. If a suitable tone only message is to be sent locally, then it can be transmitted at this time. When there is a larger gap between the global calls, the following procedure can be used. If the gap consists of four codewords, the master transmitter transmits the address words 2007696, 2007688, 2007680 and 2007672 in the four code word positions, as shown in FIG. 11.

The code words shown in the table above can therefore been considered as gap marker words. They are used to mark unused gaps and each gives its distance to the end of the gap.

When the data transmission is completed and idle words are used to fill up to the end of the batch, another special address type code word may be used to indicate this situation to the local radio transmitters.

Note that technique 3 can be combined with technique 2 described above to produce a system which is flexible and capable of being used in a large variety of circumstances.

If the gaps are not used for local data, then the transmission to the pagers will consist of normal idle words.

The techniques 1–3 shown so far were based on a paging network using the POCSAG transmission format. It is clear, however, that the invention can also be used in systems using other transmission techniques. The following shortly describes an example of the invention using the ERMES coding scheme.

ERMES is made up of 12 second subsequences and the simplest procedure for sending information from two separate sources (e.g. global and local radio paging calls) would be to use two separate subsequences, similar to the conventional system shown in FIG. 3. However, this can lead to a considerable waste of transmission time. Therefore, a procedure similar to the technique 1 described above may be used, wherein any spaces that would be filled with the ERMES equivalent of idle words can be used for transmitting local information. In order to leave the positions of the global messages unchanged, the number of words in the initial address partition of the ERMES subsequence must not be changed by the local transmitters. If this is a limitation, then the master transmitter can add a number of dummy addresses to the initial address partition so that these dummy addresses can be replaced by the local transmitters with the addresses of local messages. Since the message partition is interleaved, it is necessary to ensure that local messages are never combined with global messages in the same interleaved block. This will ensure that message reception is maintained for the global messages. If the addition of the messages from the second source affects the External Indicator Bit in system information, then this will only cause a slight reduction in battery life for a small number of receivers and will not cause any loss in message reception.

The ERMES standard defines that the local addresses must be transmitted in descending numerical order. If the procedure described above cannot maintain this requirement, separate subsequences must be transmitted for global and local transmissions.

The above examples discussed the application of the invention in a paging system with mixed global and local messages. However, the inventive techniques can also be used in other systems where a radio transmitter must transmit messages from a plurality of sources having different priorities. The invention ensures that messages having the highest priority will always be sent at their predefined times, thereby achieving synchronicity with the same messages emitted by other transmitters.

While there are shown and described present preferred embodiments of the invention, it is to be distinctly understood that the invention is not limited thereto but may be otherwise variously embodied and practiced within the scope of the following claims.

I claim:

1. A method for operating a radio transmitter sending digital messages, said radio transmitter receiving high priority messages from a first source and low priority messages from a second source, wherein each of said high priority messages is to be sent at a predefined time, said method comprising the steps of:

assembling said high priority messages into a global signal and filling gaps in said global signal with predefined gap markers, said global signal substantially corresponding to the signal to be emitted by the radio transmitter in the absence of low priority messages, feeding said global signal to said radio transmitter, determining in said radio transmitter if any of said low priority messages are to be sent and if yes, replacing at least part of said gap markers by said low priority messages.

2. The method of claim 1, wherein each of said gap markers indicates its distance from the end of its gap.

3. A method for operating a radio transmitter sending digital messages, said radio transmitter receiving high priority messages from a first source and low priority messages from a second source, wherein each of said high priority messages is to be sent at a predefined time, said method comprising the steps of:

assembling said high priority messages into a global signal and adding at least one allocation message to said global signal, said allocation message describing length and position of at least one unused gap in said global signal following said allocation message, wherein said global signal substantially corresponds to the signal to be emitted by said radio emitter in the absence of low priority messages, feeding said global signal to said radio transmitter, and determining in said radio transmitter if any of said low priority messages are to be sent and, if yes, using said allocation message for locating said gaps and replacing at least part of said gaps by said low priority messages.

4. The method of claim 3, wherein said allocation message is comprised in a high priority message addressed to said radio transmitter.

5. A method for operating a radio transmitter sending digital messages, said radio transmitter receiving high priority messages from a first source and low priority messages from a second source, wherein each of said high priority messages is to be sent at a predefined time, said method comprising the steps of:

assembling said high priority messages into a global signal comprising one or more sequences, each sequence comprising a plurality of said high priority messages and an address list, said address list comprising high priority addresses for high priority messages as well as at least one dummy address, determining in said radio transmitter if any of said low priority messages are to be sent and, if yes, replacing said at least one dummy address by at least one low priority address for said at least one low priority message.

* * * * *